United States Patent [19]

Bragg

[11] 3,948,626

[45] Apr. 6, 1976

[54] REFUELING EQUIPMENT FOR AIRCRAFT FUEL TANKS AND THE LIKE

[75] Inventor: Kenneth R. Bragg, Redondo Beach, Calif.

[73] Assignee: Parker-Hannifin Corporation, Cleveland, Ohio

[22] Filed: Oct. 25, 1974

[21] Appl. No.: 517,921

[52] U.S. Cl. .................... 55/160; 55/182; 55/196; 55/261; 220/88 B
[51] Int. Cl.² ............................................ B01D 19/00
[58] Field of Search ...... 55/160, 182, 261, 187–190, 55/196; 220/88 B

[56] References Cited
UNITED STATES PATENTS

| | | | |
|---|---|---|---|
| 3,273,313 | 9/1966 | Livesey et al. | 55/190 X |
| 3,362,137 | 1/1968 | Richards | 55/187 X |
| 3,590,559 | 7/1971 | Bragg | 55/160 X |
| 3,691,730 | 9/1972 | Hickey et al. | 55/196 X |
| 3,710,549 | 1/1973 | Nichols et al. | 55/160 |
| 3,732,668 | 5/1973 | Nichols | 55/160 |
| 3,815,330 | 6/1974 | Lawley | 55/196 X |

*Primary Examiner*—John Adee
*Attorney, Agent, or Firm*—Donnelly, Maky, Renner & Otto

[57] ABSTRACT

Refueling equipment for aircraft fuel tanks of the type which are pressurized during flight of the aircraft by an airborne source of inert gas such as nitrogen to maintain the ullage gases noncombustible characterized in that the fuel during the course of its flow through said refueling equipment is deoxygenated before it reaches the aircraft fuel tank with the oxygen liberated from the fuel being discharged from the refueling equipment. The fuel passing through the refueling equipment is deoxygenated by scrubbing with noncombustible ullage gas (fuel vapor, inert gas, and oxygen insufficient to support combustion) from the aircraft fuel tank or by scrubbing with inert gas such as nitrogen carried by said equipment via control means operative to minimize the inert gas flow according to the fuel flow rate through the equipment into the aircraft fuel tank, or by subjecting the fuel to partial vacuum while the fuel is agitated thus to liberate oxygen therefrom and to discharge the same from the refueling equipment.

18 Claims, 5 Drawing Figures

U.S. Patent   April 6, 1976   3,948,626
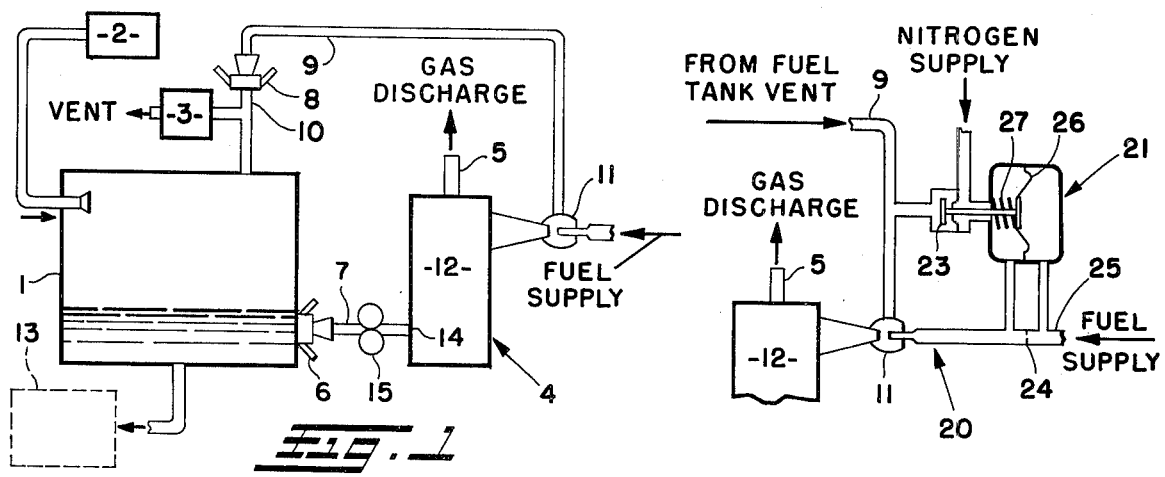
Fig. 1
Fig. 2
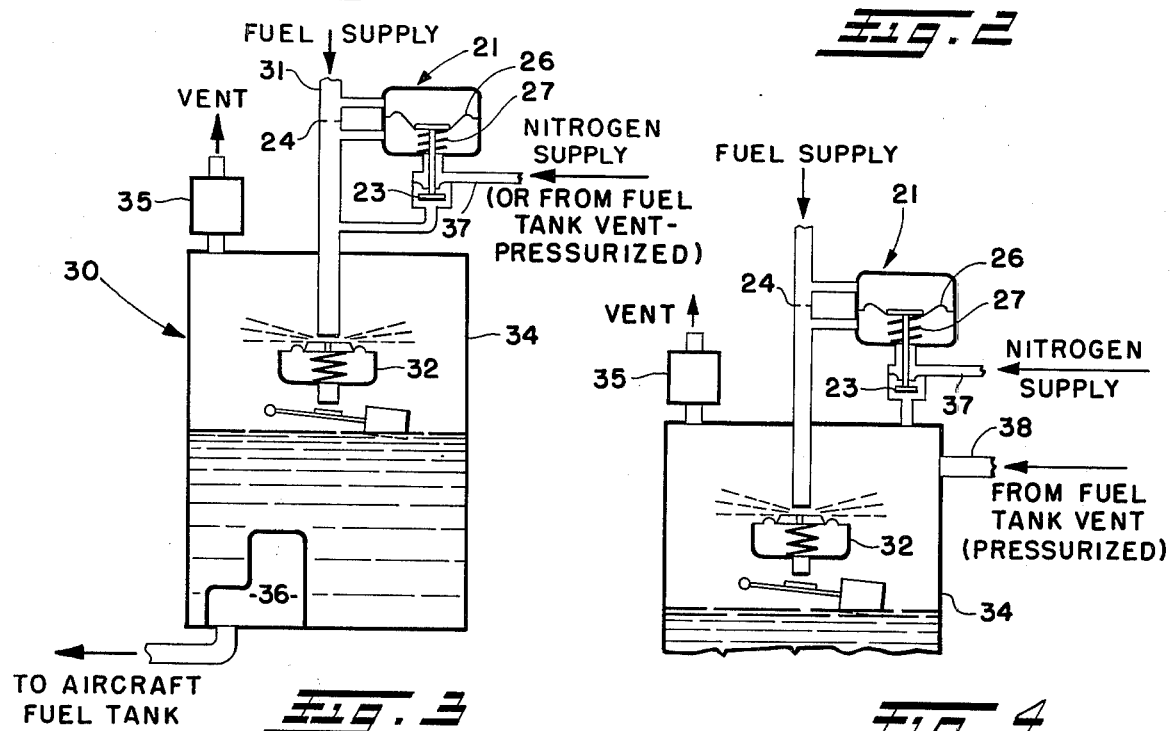
Fig. 3
Fig. 4
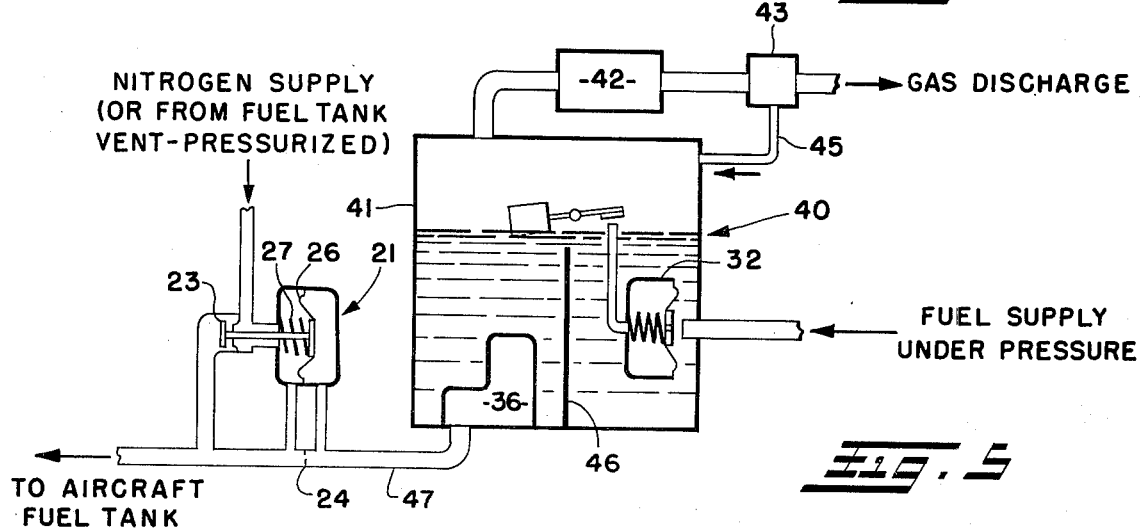
Fig. 5

3,948,626

REFUELING EQUIPMENT FOR AIRCRAFT FUEL TANKS AND THE LIKE

BACKGROUND OF THE INVENTION

In known fuel tank inerting systems an inert gas such as nitrogen is introduced into the tank ullage to render the tank ullage noncombustible and to pressurize the tank, said inert gas diluting the oxygen released from the fuel as during ascent of the aircraft and purging the same through the tank vent, and said inert gas also maintaining the tank ullage at pressure exceeding ambient pressure as during descent of the aircraft to prevent entry of air into the tank through the vent. For fuel tank inerting systems of the type just described, reference may be had to the following patents:

| | |
|---|---|
| 3,587,618 | 3,710,549 |
| 3,590,559 | 3,732,668 |
| 3,628,758 | 3,788,039 |
| 3,691,730 | 3,788,040 |
| 3,693,915 | 3,830,307 |

In the U.S. Pat. Nos. 3,587,618, 3,590,559, 3,693,915, 3,710,549, 3,732,668, and 3,788,039 the fuel with oxygen dissolved therein is scrubbed during flight. In the first two of the patents mentioned, inert gas such as nitrogen is bubbled through the fuel in the aircraft fuel tank as the aircraft ascends, the liberated oxygen being diluted by admission of inert gas into the ullage and venting through the fuel tank vent valve and in the remaining patents fuel in the tank is recirculated and mixed with inert gas to liberate oxygen from the fuel for dilution and venting by inert gas introduced into the tank ullage.

In the U.S. Pat. Nos. 3,628,758, 3,691,730, 3,710,549, 3,732,668, and 3,788,040, it is contemplated to scrub the fuel containing dissolved oxygen therein in the aircraft fuel tank while the aircraft is on the ground being refueled, the scrubbing equipment being duplicated in each aircraft and the inert gas is supplied into the tank ullage from the airborne inert gas supply to dilute the liberated oxygen and to vent the ullage through the fuel tank vent valve.

In all of these known expedients, the scrubbing equipment is in the aircraft fuel tank itself and hence must be duplicated in each aircraft.

SUMMARY OF THE INVENTION

In contradistinction to the foregoing, the present invention provides ground refueling equipment effective to deoxygenate fuel having oxygen dissolved therein during the course of its flow through the refueling equipment with the liberated oxygen being discharged from the refueling equipment and with the deoxygenated fuel being delivered to the aircraft fuel tank.

It is a principal object of this invention to provide refueling equipment for aircraft fuel tanks and the like operative during the course of flow of fuel through said refueling equipment to scrub dissolved oxygen from the fuel by using noncombustible ullage gas from the aircraft fuel tank, or by using inert gas from a supply source on the refueling equipment or by subjecting the fuel to a partial vacuum and to discharge scrubbing gas and the liberated oxygen from the refueling equipment so as to deliver deoxygenated fuel into the aircraft fuel tank. In this way, the aircraft fuel tank inerting system is greatly simplified with decreased weight of mechanical parts due to less hardware on the aircraft. Furthermore, if desired, the size of the dewar and the load of inerting medium in liquid form therein, may be minimized since the inert gas is required primarily for pressurizing the fuel tank and for providing a noncombustible ullage.

Other objects and advantages will appear from the ensuing description.

BRIEF DESCRIPTION OF THE DRAWING

FIG. 1 illustrates refueling equipment which utilizes the noncombustible ullage gas of the aircraft fuel tank to scrub oxygen from the fuel during the course of its flow through the refueling equipment, the gases including the liberated oxygen being discharged from the refueling equipment whereby deoxygenated fuel is delivered into the aircraft fuel tank;

FIG. 2 illustrates refueling equipment similar to FIG. 1 except that said equipment has a separate inert gas supply which, through a control valve, supplements the ullage gas in scrubbing of oxygen from the fuel during the course of its flow through the refueling equipment, the control valve being operative in response to the rate of flow of fuel to regulate to minimum the amount of inert gas added to the ullage gas for scrubbing purposes;

FIG. 3 illustrates refueling equipment in which the inert gas from the inert gas supply source of the refueling equipment or from the aircraft fuel tank vent (pressurized) is at least partially dissolved in the fuel. Gas is released from the fuel by spraying the fuel into a gas separator from which the gases including the liberated oxygen are vented for delivery of deoxygenated fuel into the aircraft fuel tank;

FIG. 4 is a fragmentary cross-section view of refueling equipment similar to that of FIG. 3 except that both inert gas and noncombustible ullage gas from the aircraft fuel tank are supplied into the gas separator to scrub oxygen from the fuel sprayed into the gas separator and to vent the gases including the liberated oxygen from the gas separator; and FIG. 5 illustrates yet another embodiment of the present invention wherein the fuel entering the gas separator is agitated and exposed to a partial vacuum in the gas separator thus to liberate oxygen from the fuel and to discharge it from the gas separator for delivery of deoxygenated fuel into the aircraft fuel tank, said FIG. 5 embodiment further including means for introducing either pressurized ullage gas from the aircraft fuel tank or inert gas from the refueling equipment inert gas supply source into the deoxygenated fuel stream for dissolving therein to transform the fuel from sub-saturated condition to saturated condition.

DESCRIPTION OF THE PREFERRED EMBODIMENTS

Referring first to FIG. 1, the reference numeral 1 denotes an aircraft fuel tank having associated therewith an inerting system which during flight introduces inert gas such as nitrogen from an airborne supply source 2, usually carried in liquid form in a dewar. As the fuel is being consumed during flight, inert gas is introduced into the tank ullage to maintain a predetermined differential between ullage pressure and ambient pressure. It can be seen that during descent of the aircraft, inert gas will be introduced into the tank to pressurize the ullage and prevent entry of air through the vent valve 3.

As earlier mentioned, existing fuel tank inerting systems have equipment within the aircraft fuel tank to scrub dissolved oxygen from the fuel thereby increasing the airborne load of the aircraft not only with reference to such equipment but also with reference to the carrying of a heavier load of the inerting fluid.

The present invention obviates the necessity of providing such scrubbing equipment in the aircraft fuel tank and further decreases to a minimum the airborne load of the inerting fluid.

In FIG. 1 the ground refueling equipment 4 supplies deoxygenated fuel into the aircraft fuel tank 1 and utilizes the noncombustible ullage gas in the aircraft fuel tank 1 for scrubbing oxygen from the fuel during the course of its flow through the refueling equipment 4, and the gases including the liberated oxygen are discharged from the port 5 of the refueling equipment 4. To this end, the refueling equipment 4 is provided with a fueling nozzle 6 of the fuel delivery conduit 7 which is coupled to the fuel inlet port of the tank 1 and a coupling 8 of the ullage gas conduit 9 is coupled to a branch 10 of the vent port of the aircraft fuel tank 1 and, as well known in the art, the coupling of the conduits 7 and 9 to the aforesaid tank ports will effect opening of normally closed valves (not shown) and, in addition, the fuel inlet port will be provided with a fuel inlet valve which will automatically close when the tank 1 has been filled to predetermined level. Such automatic closing of the fuel inlet valve will be effected as by a level control valve (not shown).

The refueling equipment 4 is coupled to a fuel supply source (not shown) and the ullage gas conduit 9 is connected to the suction port of an ejector 11 to mix the noncombustible ullage gas with the incoming fuel with dissolved oxygen therein and from the outlet of the ejector 11, the fuel-gas mixture passes into a fuel-gas separator 12 which, by way of illustration, may comprise a vortex gas separator from the port 5 of which the gases including oxygen liberated from the fuel are discharged and from the port 14 of which the deoxygenated fuel is conducted through conduit 7 into the fuel tank 1. When fuel flows through the ejector 11, it creates a low pressure which draws gas through conduit 9 from the fuel tank ullage into the fuel stream in the ejector 11 and the gas picks up oxygen from the fuel by diffusion. When the mixture of gas and fuel flows into the fuel-gas separator 12, the gas is discharged out of the system carrying the oxygen with it and the scrubbed fuel flows into the fuel tank 1 via the delivery conduit 7. In FIG. 1 the reference numeral 13 denotes the engines to which the fuel is delivered from the fuel tank 1.

The fuel delivery conduit 7 may have therein a boost pump 15 between the separator 12 and the fuel tank 1 to allow the fuel-gas separator 12 to operate at a lower pressure thereby to decrease the amount of dissolved gas which is carried into the fuel tank 1.

In FIG. 2, the refueling equipment 20 carries a supply of inert gas such as nitrogen separate from the nitrogen supply source 2 of the aircraft to supplement the ullage gas from the fuel tank 1. This extra flow of nitrogen would be used if, for example, the oxygen concentration in the ullage of the fuel tank 1 were too high to scrub the fuel to an acceptably low oxygen concentration. This might occur if air were allowed to enter the tank ullage along with the nitrogen from the inerting system for pressurizing the tank during descent of the aircraft in order to minimize the quantity of airborne nitrogen. The nitrogen flow control valve 21 varies the flow of the added nitrogen from the nitrogen supply in relation to the rate of flow of fluid to avoid using more nitrogen than necessary as the fuel flow rate varies. By way of illustrative example, the flow control valve 21 comprises a diaphragm operated poppet valve 23 which is spring loaded in closed direction and the pressure drop across a restriction 24 (or a venturi) in the fuel supply line 25 is applied across the diaphragm 26 so that increasing pressure differential compresses the spring 27 to open the valve 23 to increase the flow rate of nitrogen.

The refueling equipment 30 illustrated in FIG. 3 comprises a fuel pressure supply line 31, a nitrogen flow control valve 21, a modulating float operated level control valve 32, a separator tank 34 with a vent valve 35 and a boost pump 36. The nitrogen flow control valve 21 may be of the same construction as that described in FIG. 2 and is operative to supply nitrogen into the fueling supply line 31 upstream of the level control valve 32, the latter maintaining a back pressure on the supply line regardless of the fuel flow rate, the back pressure being high enough to cause the nitrogen to dissolve in the fuel. With pure nitrogen approximately 0.8 volume of nitrogen per volume of fuel is required to reduce the oxygen concentration in the fuel to 5% which is desirable in inerting systems. The pressure required to dissolve this volume of nitrogen is approximately 80 psi. As the fuel sprays out of the level control valve 32 into the separator tank 34, the dissolved gas comes out of solution bringing part of the oxygen with it. The gas passes out of the refueling equipment 30 through the vent valve 35 and the deoxygenated fuel is pumped to the aircraft fuel tank 1 by the boost pump 36. The equipment 30 accommodates fueling at any flow rate.

As in the case of FIG. 2, the fuel supply line 31 will have an orifice 24 or venturi therein to actuate the poppet valve 23 according to the pressure differential on opposite sides of the diaphragm 26 thereof.

It is to be understood that the boost pump 36 may be omitted if, for example, the vent valve 35 is set to open at say 50 psi.

In FIG. 3 it is contemplated to employ the noncombustible nitrogen-rich ullage gas instead of pure nitrogen from the nitrogen supply of the refueling equipment 30 and, in that case, the refueling equipment 30 will have a compressor (not shown) in the conduit 37 to pressurize the ullage gas. The system of FIG. 3 requires a high pressure fuel and nitrogen source but it does provide a means of reaching the required fuel oxygen concentration with a minimum of excess nitrogen.

The FIG. 4 embodiment is similar to FIG. 3 except that nitrogen and noncombustible nitrogen-rich ullage gas is supplied into the separator tank 34 into which the fuel is being sprayed from valve 32 and, again, as described in connection with FIG. 3 the ullage gas conduit 38 will have a compressor therein (not shown) to pressurize the ullage gas.

The refueling equipment 40 shown in FIG. 5 removes oxygen from the fuel by discharging the fuel into a separator which is held at an absolute pressure on the order of that which is attained at the altitude to which the aircraft will climb, for example, 3 psia. The fuel is discharged into the separator tank 41 through valve 32 with sufficient turbulence to knock out as much air out of the fuel as would come out during the flight so the oxygen concentration will be as low as it needs to be. The partial vacuum is maintained by a vacuum pump 42 and if desired, the gases discharged from the vacuum pump 42 may pass through a demister and/or vapor condensor 43 with the condensate being conducted into the separator tank 41 through the conduit 45 as shown. The fuel inlet valve 32 is float operated as shown to maintain the fuel level in the separator tank 41 above the partition 46 with the deoxygenated fuel being pumped by the boost pump 36 to the aircraft fuel tank 1.

In FIG. 5 the deoxygenated fuel will be sub-saturated with gas with respect to sea level pressure and, hence, the fuel will have a potential to absorb gas from the ullage of the aircraft fuel tank 1 which can create a demand on the aircraft nitrogen supply and thereby increase the airborne dewar size. Therefore, it has been found desirable to supply nitrogen to the fuel as it is delivered through the conduit 47 to the aircraft fuel tank 1 and this source can be from a nitrogen supply source on the refueling equipment 40 or, again, from the aircraft fuel tank ullage and, in the latter case, it would be desirable to pressurize the ullage gas by compressor means not shown. The nitrogen flow control valve 21 may be the same as that shown in FIGS. 2, 3, and 4, with nitrogen or nitrogen-rich ullage gas being controlled in accordance with the pressure drop across a restrictor 24 or venturi on opposite sides of the diaphragm 26.

With further reference to FIG. 5, in lieu of the gas supply as shown, the delivery conduit 47 may have an ejector 11 therein to mix ullage gas from the aircraft fuel tank 1 with the sub-saturated fuel before the ullage gas is displaced overboard by the fueling operation.

It is to be understood that the fuel tank 1 in FIG. 1, together with the inerting fluid supply 2 and vent valve 3, may be an intermediate or storage tank from which the deoxygenated fuel will be supplied to an inerted aircraft fuel tank 13. Similarly, in FIGS. 2–5 the deoxygenated fuel from the fuel-gas separators 12, 34, and 41 may be conducted to such intermediate fuel tank 1 rather than directly to the aircraft fuel tank. With a refueling system having the intermediate tank, the latter may be filled with deoxygenated fuel whereby the refueling of the aircraft tank 13 with deoxygenated fuel may be accomplished at any desired fuel flow rate.

The embodiments of the invention in which an exclusive property or privilege is claimed are defined as follows:

1. A refueling system for a fuel tank in which the ullage gas is noncombustible and includes inert gas which is introduced into said tank from a source of such inert gas to pressurize said tank; said tank having an ullage gas outlet port and a fuel inlet port; said system comprising a fuel delivery conduit detachably connected with said fuel inlet port to refuel said tank; and means for removing oxygen dissolved in the fuel during the course of its flow through said system, and including a gas discharge opening through which the liberated oxygen is discharged from said system whereby deoxygenated fuel is delivered from said fuel delivery conduit into said tank; said means comprising an ullage gas conduit detachably connected with said ullage gas outlet port for mixing of ullage gas with the fuel flowing through said system; and fuel-gas separator means having said gas discharge opening; the flow of deoxygenated fuel through said fuel delivery conduit into said tank being effective to displace ullage gas through said ullage gas conduit as said tank is filled with deoxygenated fuel.

2. The system of claim 1 wherein said system is provided with another inert gas supply source separate and apart from said first-mentioned inert gas supply source for introducing inert gas into said ullage gas conduit to supplement the ullage gas in the scrubbing of dissolved oxygen from the fuel; and wherein valve means in the flow path of inert gas from said another source is responsive to variable fuel flow rate through said system to regulate the flow of inert gas for deoxygenating the fuel.

3. The system of claim 2 wherein said valve means responds to decreasing fuel flow rate to progressively decrease the flow of inert gas flow for mixing with the fuel.

4. The system of claim 1 wherein said fuel-gas separator means comprises a vortex separator having said gas discharge opening.

5. The system of claim 1 wherein said fuel-gas separator means comprises a separator tank into the ullage of which the fuel-gas mixture is sprayed.

6. The system of claim 5 wherein the fuel-gas mixture is sprayed into said gas separator tank ullage via a level control valve which closes when the level of the deoxygenated fuel reaches a predetermined level and which opens for spraying of fuel-gas mixture when the level of the deoxygenated fuel is below said predetermined level.

7. The system of claim 5 wherein said gas separator tank has pump means associated with said fuel outlet to pump the deoxygenated fuel from said gas separator tank to said fuel delivery conduit.

8. The system of claim 5 wherein said gas discharge opening of said gas separator tank has a vent valve therein which builds up pressure in said gas separator tank ullage effective to act on the deoxygenated fuel to assist in delivery thereof to said fuel delivery conduit.

9. The system of claim 1 wherein said fuel tank ullage gas in said ullage gas conduit is additionally pressurized, mixed with the fuel, and at least partially dissolved in the fuel; and wherein spray means sprays the fuel-gas mixture into said fuel-gas separator means.

10. The system of claim 1 wherein the flow of pressurized fuel tank ullage gas passes through a control valve which regulates the flow of such pressurized ullage gas for mixing with the fuel in accordance with the fuel flow rate.

11. The system of claim 1 wherein inert gas from another source is introduced into said gas separator means to scrub oxygen from the fuel sprayed thereinto for discharge of gases that include the oxygen liberated from the fuel through said gas discharge opening.

12. A refueling system for an aircraft fuel tank in which the ullage gas is noncombustible and includes inert gas which during flight of the aircraft is introduced into said tank from an airborne source of such inert gas to pressurize said tank; said system comprising a fuel delivery conduit detachably connected with said tank to refuel it; and means for removing oxygen dissolved in the fuel during the course of its flow through said system, and including a gas discharge opening through which the liberated oxygen is discharged from said system whereby deoxygenated fuel is delivered from said fuel delivery conduit into said tank; said means comprising an ullage gas conduit detachably connected with a vent port of said tank for mixing of ullage gas with the fuel flowing through said system; and fuel-gas separator means having said gas discharge opening; the flow of deoxygenated fuel into said tank being effective to displace ullage gas through said ullage gas conduit as said tank is filled with deoxygenated fuel.

13. The system of claim 12 wherein inert gas from a supply source other than said airborne source is also mixed with the fuel flowing through said system.

14. The system of claim 12 wherein said ullage gas conduit also communicates with an inert gas supply source other than said airborne source for mixing of ullage gas and inert gas from said other source with the fuel flowing through said system.

15. The system of claim 13 wherein valve means in the flow path of inert gas from said other source is responsive to variable fuel flow rate through said system to regulate the flow of inert gas for deoxygenating the fuel.

16. The system of claim 12 wherein said system is provided with an inert gas supply source separate and apart from the airborne inert gas supply source for introducing inert gas into said ullage gas conduit to supplement the ullage gas in the scrubbing of dissolved oxygen from the fuel.

17. A refueling system for an aircraft fuel tank in which the ullage gas is noncombustible and includes inert gas which during flight of the aircraft is introduced into said tank from an airborne source of such inert gas to pressurize said tank; said system comprising another fuel tank in which the ullage gas is noncombustible and includes inert gas which is introduced into said another tank from another source of inert gas to pressurize said another tank; a fuel delivery conduit detachably connected with said aircraft fuel tank to refuel it with fuel from said another fuel tank; and means for removing oxygen dissolved in the fuel during the course of its flow through said system into said another fuel tank, and including a gas discharge opening through which the liberated oxygen is discharged from said system for flow of deoxygenated fuel into said another fuel tank and from which deoxygenated fuel is delivered from said fuel delivery conduit into said aircraft fuel tank; said means comprising an ullage gas conduit connected to a vent port of said another fuel tank for mixing of ullage gas with the fuel flowing through said system; and fuel-gas separator means having said gas discharge opening.

18. The system of claim 11 wherein inert gas from a source other than said airborne source and said another source is mixed with the fuel flowing through said system.

* * * * *